Jan. 3, 1961 H. S. ZABLOCKI ET AL 2,967,216
CONTACT MAKING ASSEMBLY
Filed March 8, 1960
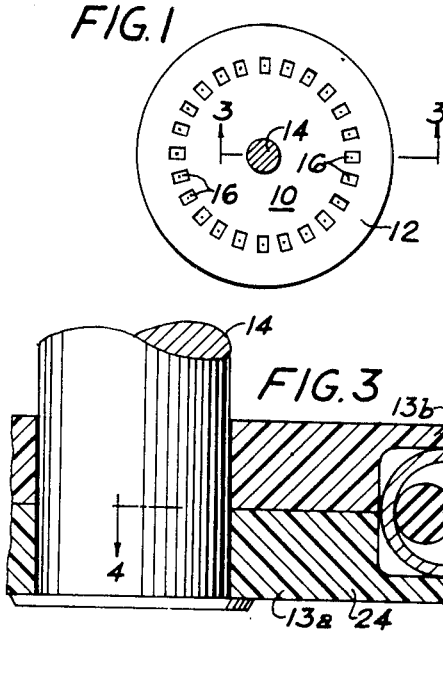
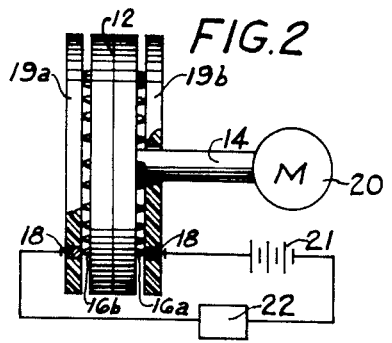
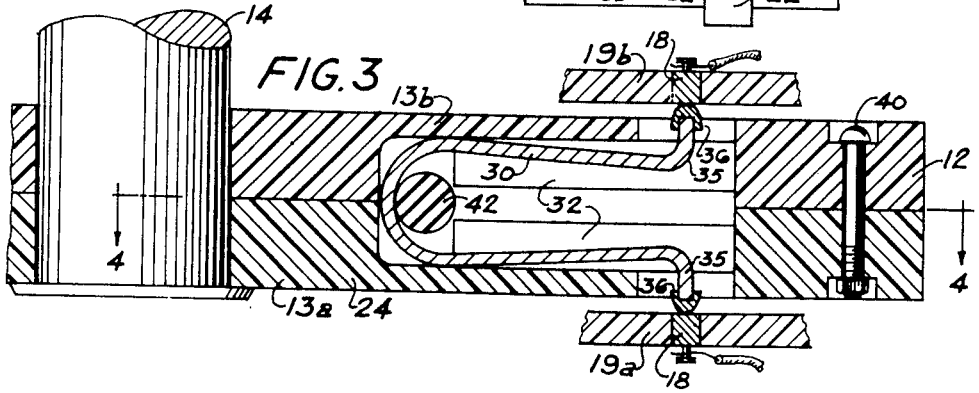
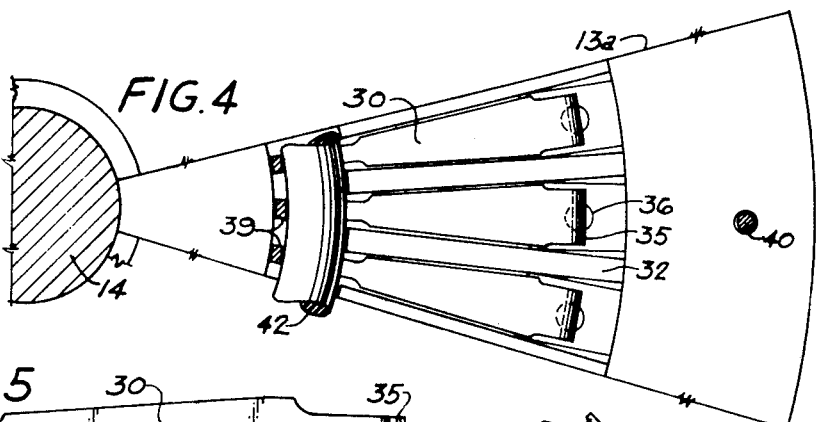
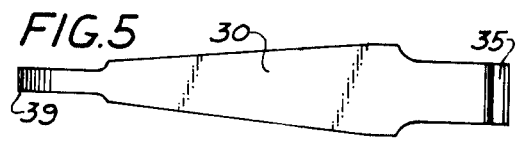
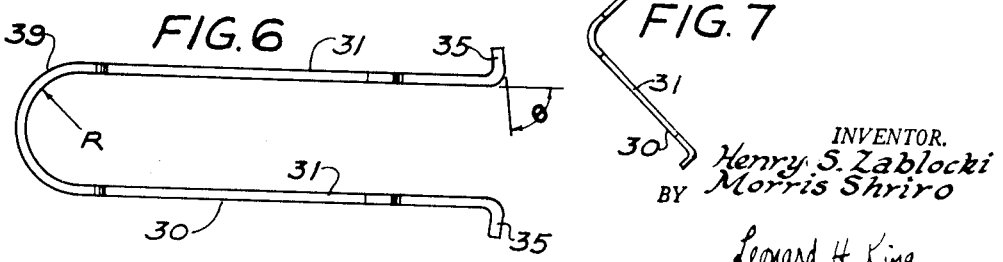
INVENTOR.
Henry S. Zablocki
BY Morris Shriro
Leonard H. King

United States Patent Office 2,967,216
Patented Jan. 3, 1961

2,967,216
CONTACT MAKING ASSEMBLY

Henry S. Zablocki, 181 Hillside Ave., Nutley, N.J., and Morris A. Shriro, 88 Sheridan Ave., Mount Vernon, N.Y.

Filed Mar. 8, 1960, Ser. No. 13,623

5 Claims. (Cl. 200—24)

This invention relates to an apparatus for making electrical contact between two relatively rotating devices.

In order to maintain uniform wiper pressure between an electrically conductive wiper and a conductive surface being wiped, it is conventional to employ spring loading means. It has been found that where a relatively high rate spring is employed for this purpose, relatively greater change in spring pressure results as the wiper contact wears, which in turn changes the level of generated noise and/or the electrical contact resistance. "Rate" in this context means unit change in spring force per unit change in deflection.

In applications where the direction of rotation of the wiper, or wiped surface, is reversed from time to time, it is not uncommon for the wiper contact to rock as the direction of movement is reversed so that two chisel-shaped wear surfaces are formed leading to excessive wear of the wiped member. This latter problem is of greater concern than the problem of change in spring pressure.

Briefly stated, the problem of change in spring pressure has been solved, by the device of this invention, by employing a low rate spring which is pre-stressed. The device includes a hub member and a plurality of flat hairpin-shaped pre-stressed springs positioned radially outwardly from the hub. An O ring clamps the springs to the hub and a pair of opposed plates compress the legs of the springs, to a predetermined degree, thus serving to uniformly tension and align all of the spring members. Each leg of the hairpin spring provides a contact making surface, thereby enabling the device to be employed to provide switching between pairs of fixed terminals carried by the plates.

The low spring rate results, in part, from the relatively great length of the spring from its pivot point behind the O ring to the contact, and from the relatively thin flat spring shape. The flat shape further tends to discourage rocking of the contact.

The device of this invention may be advantageously employed to make contact to two relatively rotating members requiring a plurality of contact making elements.

These and still other objects and advantages will, in part, be pointed out with particularity and will in part, become obvious from a consideration of the following description taken in conjunction with the accompanying drawings.

In the drawings:

Figure 1 shows a plan view of a rotatable embodiment of the present invention.

Figure 2 is a side view of the device shown in Figure 1 as employed in a switching apparatus, components of a typical associated circuit being shown schematically.

Figure 3 is an enlarged section taken along lines 3—3 of Figure 1.

Figure 4 is a section taken along lines 4—4 of Figure 3.

Figures 5 and 6 show in plan and in elevation, respectively, the details of a preferred spring member.

Figure 7 is a side view of the spring of Figures 5 and 6 in a relaxed condition.

Referring now to the drawings, in Figure 1 there is shown the structure, identified generally by the numeral 10, which comprises an insulator plastic wheel 12, mounted on a shaft 14, and a plurality of contacts 16, he latter being shown protruding from wheel 12.

As shown in Figure 2, the wheel is rotated by a motor 20, coupled to shaft 14, causing contact 16a, which is connected to contact 16b, by means to be described more fully hereinafter, to pass between fixed contacts 18, carried by members 19a and 19b. Members 19a and 19b may be, for example, formed of a phenolic insulator base having insert molded copper contact buttons 18. The device is presently shown embodied in a multipole switch. By way of example there is shown an external circuit comprising a battery 21 and a control circuit 22 connected between terminals 18.

It is to be understood that contacts 18, as shown, are typical of additional like contacts which may be provided to meet requirements of particular circuitry.

Referring now to Figure 3 there is shown a portion of the wheel member 12. The wheel 12 comprises a pair of plates 13a and 13b molded from insulator plastic and having integrally formed matching recesses which define an annular cavity. The inner diameter of the cavity is bounded by a hub portion 24. A plurality of spring members 30, such as shown in Figures 5 and 6, are positioned within the annular recess and are maintained separated from one another by ribs 32 comolded with plates 13a and 13b.

The springs 30 can be described as hairpin-shaped, with the ends of the legs bent outwardly to form portions 35. Affixed to portions 35 there are provided precious metal contact members 36. Contact members 36 may be soldered, welded, or brazed in place.

The radius of curvature, R, of the reverse loop portion 39, is such that when the cavity is closed by the assembly of members 13a and 13b, the springs are stressed to the position shown in Figure 6, with the legs 31 of the hairpin lying along the inside surface of the cavity. After the assembly is positioned between the pair of contact carrying plates 19a and 19b, the springs 30 are further stressed so that they assume the position shown in Figure 3. Prior to assembly the legs of the springs, in their relaxed position, are spread apart, as shown in Figure 7.

The device is assembled by arranging a plurality of the springs 30 radially about the hub portion of wheel section 13a, with their legs coaxially aligned with the axis of the shaft 14. The O ring 42 is then slipped between the legs of the hairpin springs and the springs reoriented so as to extend radially from the hub. The other half of the wheel 13b is then placed in position and the two halves fastened together by fastening means 40.

A feature of this invention is the employment of pre-stressed springs which provides high operating force with but low spring rate. This feature results in negligible change of operating force with contact wear.

It will be appreciated that either one or both of the fixed contact bearing members 19a, 19b, may be moved while member 12 is maintained stationary.

Referring again to Figure 6, it will be noted that the end portions 35 are at an angle $\theta$ with respect to leg portions 31. The angle is so chosen as to make the end portions 35 and 36 extend perpendicularly out from the wheel 12 when the spring legs are deflected, by the pressure exerted by the contact bearing plates, 19a, 19b.

In a particular device an O ring having a diameter of 0.071" in cross-section, and a mean radius of 0.810", was employed in conjunction with a spring curved about a 0.095" radius. A clearance of 0.008"±0.002" between the separators 32 and spring members 30 was provided.

Typical of materials for the various components which have been found to be suitable for the practice of the invention include insulator plastics such as phenol formaldehyde, polystyrene, and polymethyl methacrylate. The O ring may be either synthetic or natural rubber, or other equivalent resilient non-conductive material. A suitable material for the spring has been found to be beryllium copper. Contacts 36 may be formed of conventional contact materials such as coin silver.

What is claimed is:

1. A rotatable contact making assembly, for making contact to a pair of spaced electrically conductive surfaces, comprising a wheel, including an insulator hub portion and a cavity portion; a plurality of hairpin shaped resilient members located in the cavity, each of said resilient members including a pair of leg portions terminating in angularly bent end portions outwardly extending with respect to each other, said leg portions being joined by an integral loop portion, said resilient members being formed of flat stock oriented to provide a long dimension along the plane of rotation and a thin dimension transverse thereto, said plurality of members being secured to said hub portion by a resilient O-ring member; means carried by said wheel deform said resilient members within the cavity so as to normally position said leg members substantially parallel to each other in a generally hairpin configuration; and contact members affixed to said angularly bent end portions, whereby said leg portions are inwardly bent when said surfaces are contacted by said contact members, so as to place the said resilient members in stress.

2. The apparatus of claim 1 wherein said end portions are perpendicular to the planes of the surfaces being contacted when said leg members are inwardly bent by said surfaces.

3. A rotatable contact making assembly, for making contact to a pair of spaced electrically condutive surfaces, comprising a wheel, including an insulator hub portion and a cavity portion; a plurality of hairpin shaped resilient members located in the cavity, each of said resilient members including a pair of leg portions terminating in angularly bent end portions outwardly extending with respect to each other, said leg portions being joined by an integral loop portion, said resilient members being formed of flat stock oriented to provide a long dimension along the plane of rotation and a thin dimension transverse thereto, said plurality of members being secured to said hub portion by a resilient O-ring member; means carried by said wheel deform said resilient members within the cavity so as to normally position said leg members substantially parallel to each other in a generally hairpin configuration; contact members affixed to said angularly bent end portions, whereby said leg portions are inwardly bent when said surfaces are contacted by said contact members, so as to place the said resilient members in stress, and means to rotate said wheel.

4. The apparatus of claim 3 wherein said end portions are perpendicular to the planes of the surfaces being contacted when said leg members are inwardly bent by said surfaces.

5. A rotatable contact making assembly, for making contact to a pair of spaced electrically conductive surfaces, comprising a wheel, including an insulator hub portion and a cavity portion; a plurality of hairpin shaped resilient members located in the cavity, each of said resilient members including a pair of leg portions terminating in angularly bent end portions outwardly extending with respect to each other, said leg portions being joined by an integral loop portion, said resilient members being formed of flat stock oriented to provide a long dimension along the plane of rotation and a thin dimension transverse thereto, said plurality of members being secured to said hub portion by a resilient O-ring member; and contact members affixed to said angularly bent end portions, whereby said leg portions are inwardly bent when said surfaces are contacted by said contact members, so as to place the said resilient members in stress.

References Cited in the file of this patent
UNITED STATES PATENTS

| | | |
|---|---|---|
| 2,549,998 | Allison | Apr. 24, 1951 |
| 2,694,756 | Warnke | Nov. 16, 1954 |
| 2,944,121 | Wasylenko | July 5, 1960 |